United States Patent
Gill

(10) Patent No.: US 8,212,387 B2
(45) Date of Patent: Jul. 3, 2012

(54) CONNECTION MODULE FOR PROVIDING N+N AND M+1 REDUNDANT POWER DISTRIBUTION

(75) Inventor: Jaspal Gill, Danville, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/081,900

(22) Filed: Apr. 7, 2011

(65) Prior Publication Data

US 2011/0187187 A1  Aug. 4, 2011

Related U.S. Application Data

(63) Continuation of application No. 11/867,882, filed on Oct. 5, 2007, now Pat. No. 7,944,082.

(51) Int. Cl.
*H02J 5/00* (2006.01)

(52) U.S. Cl. ............ 307/19; 307/11; 307/18; 307/26; 307/43; 307/72; 307/75

(58) Field of Classification Search ............ 307/11, 307/18–19, 26, 43, 72, 75
See application file for complete search history.

(56) References Cited

U.S. PATENT DOCUMENTS

| | | | | |
|---|---|---|---|---|
| 4,185,315 A * | 1/1980 | Miller | | 361/205 |
| 5,245,220 A | 9/1993 | Lee | | |
| 5,499,187 A | 3/1996 | Smith | | |
| 5,715,156 A | 2/1998 | Yilmaz et al. | | |
| 5,726,506 A * | 3/1998 | Wood | | 307/147 |
| 5,754,868 A * | 5/1998 | Yamamoto et al. | | 713/300 |
| 5,861,684 A * | 1/1999 | Slade et al. | | 307/66 |
| 5,923,551 A | 7/1999 | Deloy | | |
| 6,134,125 A | 10/2000 | Wenzel | | |
| 6,459,604 B1 * | 10/2002 | Youn et al. | | 363/142 |
| 6,586,850 B1 | 7/2003 | Powers | | |
| 6,614,752 B1 | 9/2003 | Parrish et al. | | |
| 6,677,687 B2 | 1/2004 | Ho et al. | | |
| 6,784,568 B2 | 8/2004 | Powers | | |
| 6,950,895 B2 | 9/2005 | Bottom | | |
| 6,968,470 B2 | 11/2005 | Larson et al. | | |
| 7,190,091 B1 | 3/2007 | Marshall | | |
| 7,203,846 B2 | 4/2007 | Bresniker et al. | | |
| 7,215,044 B2 | 5/2007 | Mistry et al. | | |
| 7,224,086 B2 | 5/2007 | Germagian et al. | | |
| 7,313,717 B2 | 12/2007 | Vecoven et al. | | |
| 7,362,572 B1 | 4/2008 | Wierzbicki et al. | | |
| 7,388,305 B2 | 6/2008 | McCoy et al. | | |
| 7,394,170 B2 | 7/2008 | Kirkorian | | |
| 7,474,016 B2 | 1/2009 | Wang et al. | | |
| 7,516,025 B1 | 4/2009 | Williams et al. | | |
| 7,554,828 B2 | 6/2009 | Wilson | | |
| 2002/0125854 A1 * | 9/2002 | Williamson | | 318/727 |
| 2002/0137382 A1 | 9/2002 | Shirakura et al. | | |
| 2003/0036806 A1 * | 2/2003 | Schienbein et al. | | 700/1 |
| 2003/0155815 A1 | 8/2003 | Olesiewicz | | |
| 2005/0071470 A1 | 3/2005 | O'Brien et al. | | |
| 2005/0134239 A1 * | 6/2005 | Harris et al. | | 323/210 |
| 2005/0162830 A1 * | 7/2005 | Wortman et al. | | 361/695 |

(Continued)

*Primary Examiner* — Adi Amrany
(74) *Attorney, Agent, or Firm* — Harrity & Harrity, LLP

(57) ABSTRACT

A device may include an interconnect module that includes a number of ports, where each port is configured to receive both an alternating current (AC) power supply and a direct current (DC) power supply; where the interconnect module provides power from the received power supplies to a plurality of field replaceable units (FRUs).

20 Claims, 11 Drawing Sheets

U.S. PATENT DOCUMENTS

2006/0262580 A1 11/2006 Liu
2008/0212276 A1 9/2008 Bottom et al.
2008/0244311 A1 10/2008 Elliott et al.
2008/0320322 A1 12/2008 Green et al.

* cited by examiner

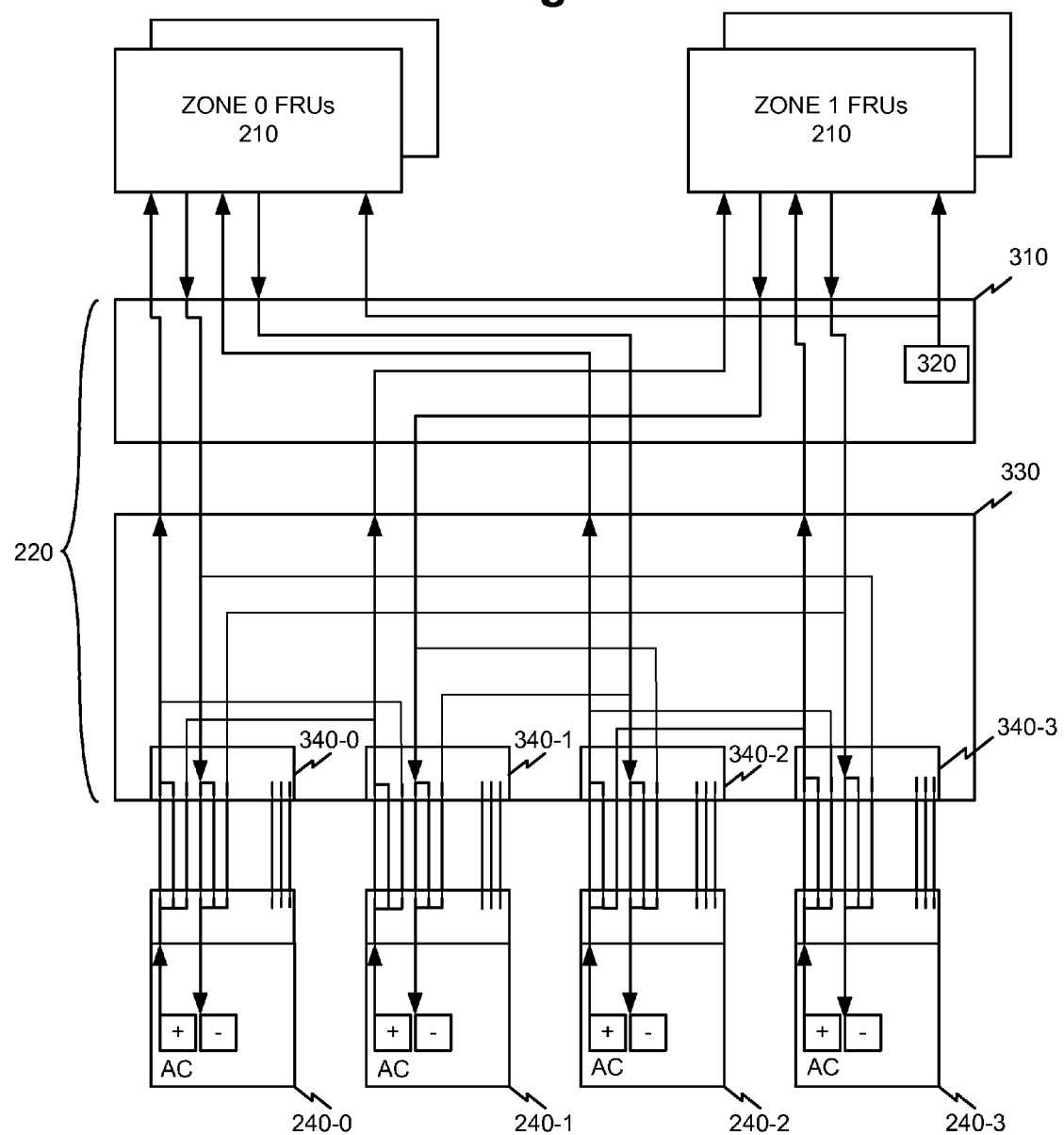

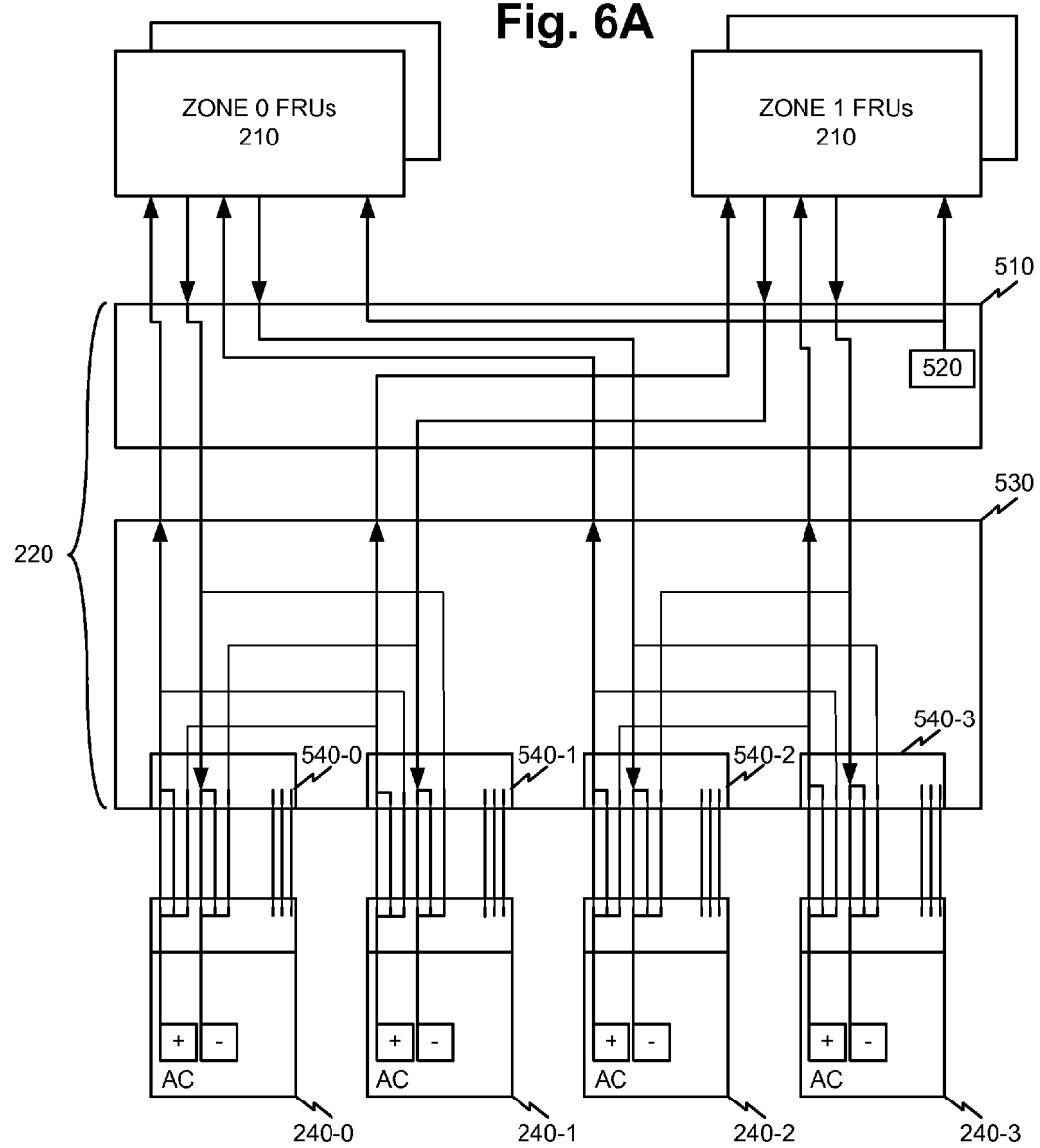

CONNECTION MODULE FOR PROVIDING N+N AND M+1 REDUNDANT POWER DISTRIBUTION

RELATED APPLICATION

This application is a continuation of U.S. patent application Ser. No. 11/867,882, filed Oct. 5, 2007, now U.S. Pat. No. 7,944,082, issued May 17, 2011, which is incorporated herein by reference.

BACKGROUND

Power supply systems for network devices generally provide power to multiple zones within the network devices and also contain backup power supplies commonly referred to as redundant power systems. In some circumstances, a direct current (DC) power system may provide N+N redundant power where N DC power supplies (e.g., N=2) provide power to the N zones within the device and N DC power supplies (e.g., N=2) provide backup power to the N zones. In other circumstances, an alternating current (AC) power supply system may provide M+1 redundant power, where M AC power supplies (e.g., M=3) provide power to the zones and one AC power supply provides redundant power. These existing N+N DC power systems and M+1 AC power systems typically require two different connection modules within the device or require separate and distinct connection ports within a same connection module within the device, which adds to both the cost and complexity of the device.

SUMMARY

In accordance with one aspect, a device is provided. The device may include a connection module that includes a number of ports, where each port is configured to receive both an alternating current (AC) power supply and a direct current (DC) power supply; where the connection module provides power from the received power supplies to a plurality of field replaceable units (FRUs).

According to another aspect, a method may include providing a first number of ports, where each port is configured to receive both an alternating current (AC) power supply and a direct current DC power supply; receiving into the first number of ports at least one of a first number of DC power supplies or a first number of AC power supplies; providing a second number of power zones; and delivering power to the second number of power zones, where N+N redundant power is applied to the second number of power zones when the first number of DC power supplies are received into the first number of ports and where M+1 redundant power is applied to the second number of power zones when the first number of AC power supplies are received into the first number of ports.

According to another aspect, a device may include two power zones, where each power zone includes a plurality of field replaceable units (FRUs); and a connection module, where the connection module includes four ports, where each port is configured to receive both an alternating current (AC) power supply and a direct current (DC) power supply, where the connection module connects the received four power supplies to the two power zones within the device.

According to another aspect, a device may include means for receiving a power supply, where the means for receiving a power supply is configured to receive both an alternating current (AC) power supply and a direct current (DC) power supply; and means for providing power to power zones, where N+N redundant power is applied to the power zones via the means for providing power when a plurality of DC power supplies are connected to a plurality of means for receiving a power supply and M+1 redundant power is applied to the power zones via the means for providing power when a plurality of AC power supplies are connected to a plurality of means for receiving a power supply.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

FIGS. 4A and 4B illustrate the connection module of FIG. 2 supplying redundant power within the exemplary device of FIG. 1 according to a first M+1 exemplary implementation;

FIGS. 6A and 6B illustrate the connection module of FIG. 2 supplying redundant power within the exemplary device of FIG. 1 according to a second M+1 exemplary implementation.

DETAILED DESCRIPTION

The following detailed description of the embodiments refers to the accompanying drawings. The same reference numbers in different drawings may identify the same or similar elements. Also, the following detailed description does not limit the embodiments. Instead, the scope of the embodiments is defined by the appended claims and equivalents of the claimed features.

Figure 1:
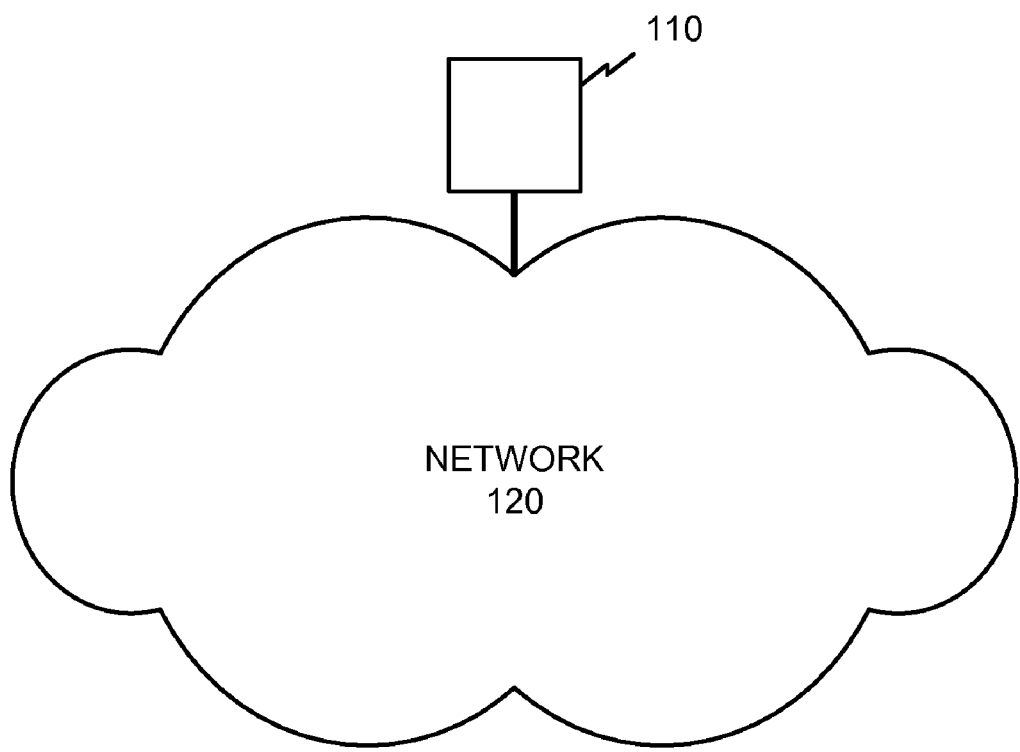
FIG. 1 is a diagram of an exemplary device connected to a network.

FIG. 1 shows an exemplary device 110 in which concepts described herein may be implemented. As shown, device 110 may connect to network 120. Device 110 may include a network device for performing network-related functions, such as for example, a router, a server or a switch. Network 120 may include the Internet, an ad hoc network, a local area network (LAN), a wide area network (WAN), a metropolitan area network (MAN), a cellular network, a public switched telephone network (PSTN), any other network, or a combination of networks. Device 110 may communicate with other devices (not shown) and may communicate through a wired or wireless communication links via network 120.

Figure 2:
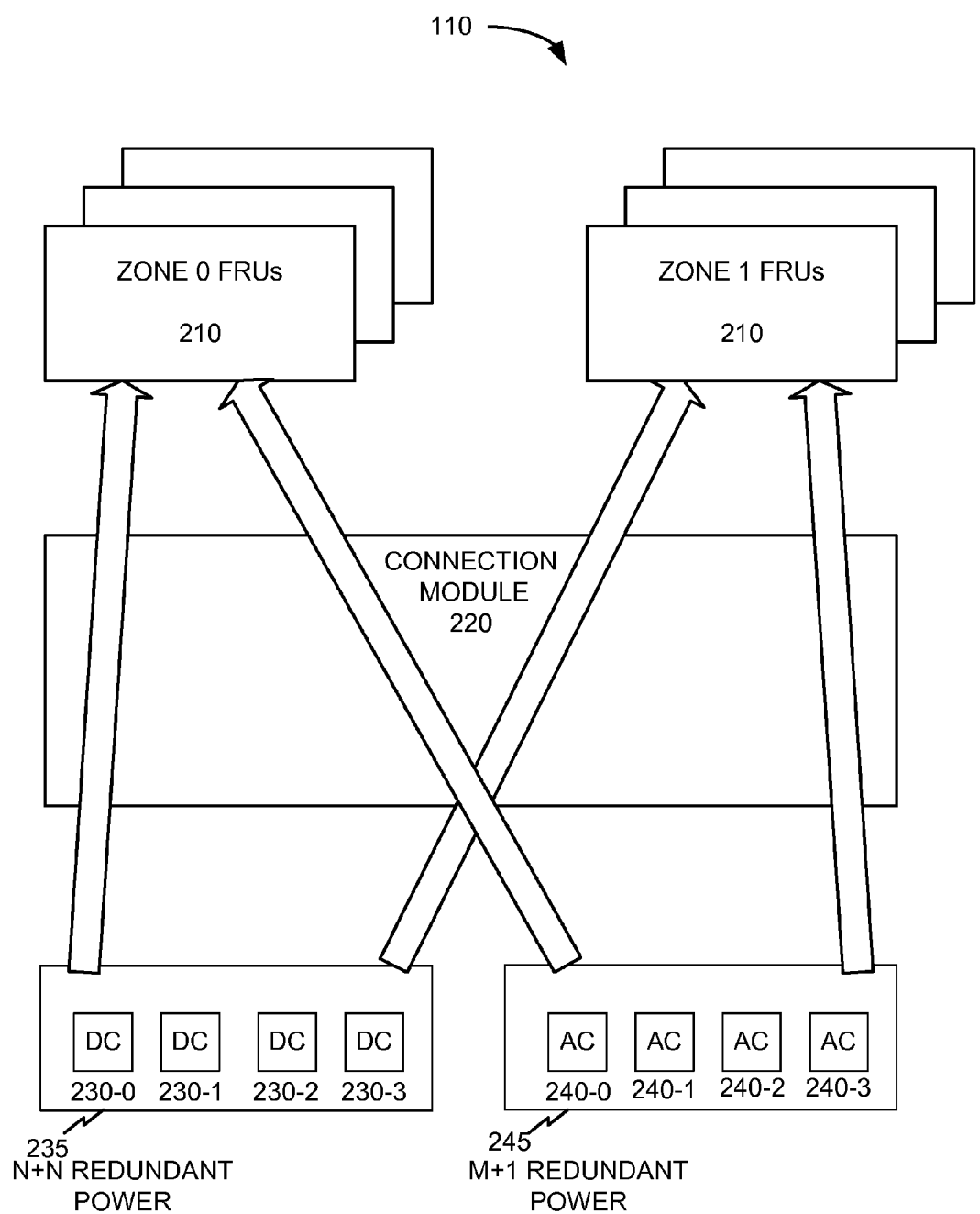
FIG. 2 is a diagram of the use of a connection module to supply N+N or M+1 redundant power to power zones within the exemplary device of FIG. 1.

FIG. 2 is a block diagram illustrating the use of a connection module to supply N+N or M+1 redundant power connections to power zones within device 110 according to exemplary implementations described herein. Device 110 may include a number of field replaceable units (FRUs) 210, a connection module 220, a number of power entry modules (PEMs) 230-0 to 230-3 (collectively referred to as PEMs 230) that supply N+N redundant power 235, and a number of power supplies (PSs) 240-0 to 240-3 (collectively referred to a PSs 240) that supply M+1 redundant power 245. As shown, a number of FRUs 210 may be included in each of the power zones (i.e., zone 0 and zone 1 shown by way of example) within device 110.

FRUs 210 may include any replaceable unit or assembly of electronic devices. When device 110 takes the form of a network device, such as a router, a web server, a switch, or the like, each FRU 210 may include a line card. FRUs 210 may be included in each of the different power zones within device 110 (e.g., zone 0 or zone 1). In one example, zone 0 may contain seven (7) FRUs 210 and zone 1 may contain seven (7) FRUs 210. Continuing with this example, the total power required by device 110 may be 2400 Watts, where each of the 14 FRUs 210 may require 235 Watts and additionally, each zone may also include a cooling fan motor assembly (not shown) where each cooling fan motor assembly may require 150 Watts of power. FRUs 210 may include two input connections to receive power and two output connections to return power, where the two input connections may be diode-ORed together and the two output connections returning power may be diode-ORed together, for example.

Connection module 220 may include connection ports to receive power from PEMs 230 or PSs 240 and supply power to FRUs 210. As described in FIGS. 3A-6B below, connection ports within connection module 220 may receive either one of a number of PEMs 230 or a number of power supplies (PSs) 240 and may supply N+N redundant power when PEMs 230 are connected and may supply M+1 redundant power when PSs 240 are connected to connection module 220.

PEMs 230 may include a non load sharing DC power supply and connections necessary to connect to connection module 220. PSs 240 may include a load sharing AC power supply, circuitry to convert AC power to DC power and connections necessary to connect DC power to connection module 220.

Figure 3A:
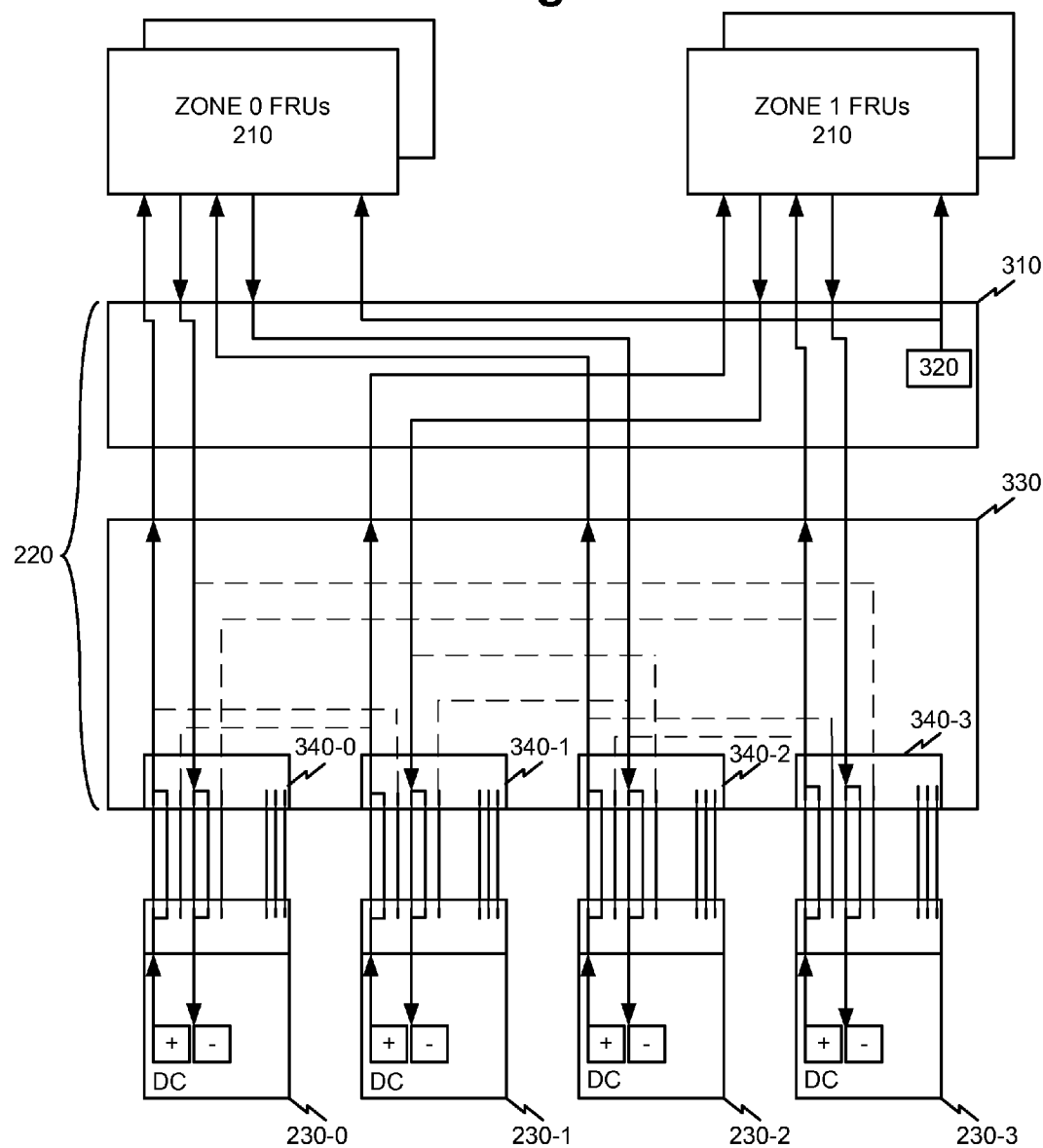
FIGS. 3A and 3B illustrate the connection module of FIG. 2 supplying redundant power within the exemplary device of FIG. 1 according to a first N+N exemplary implementation.
Figure 3B:
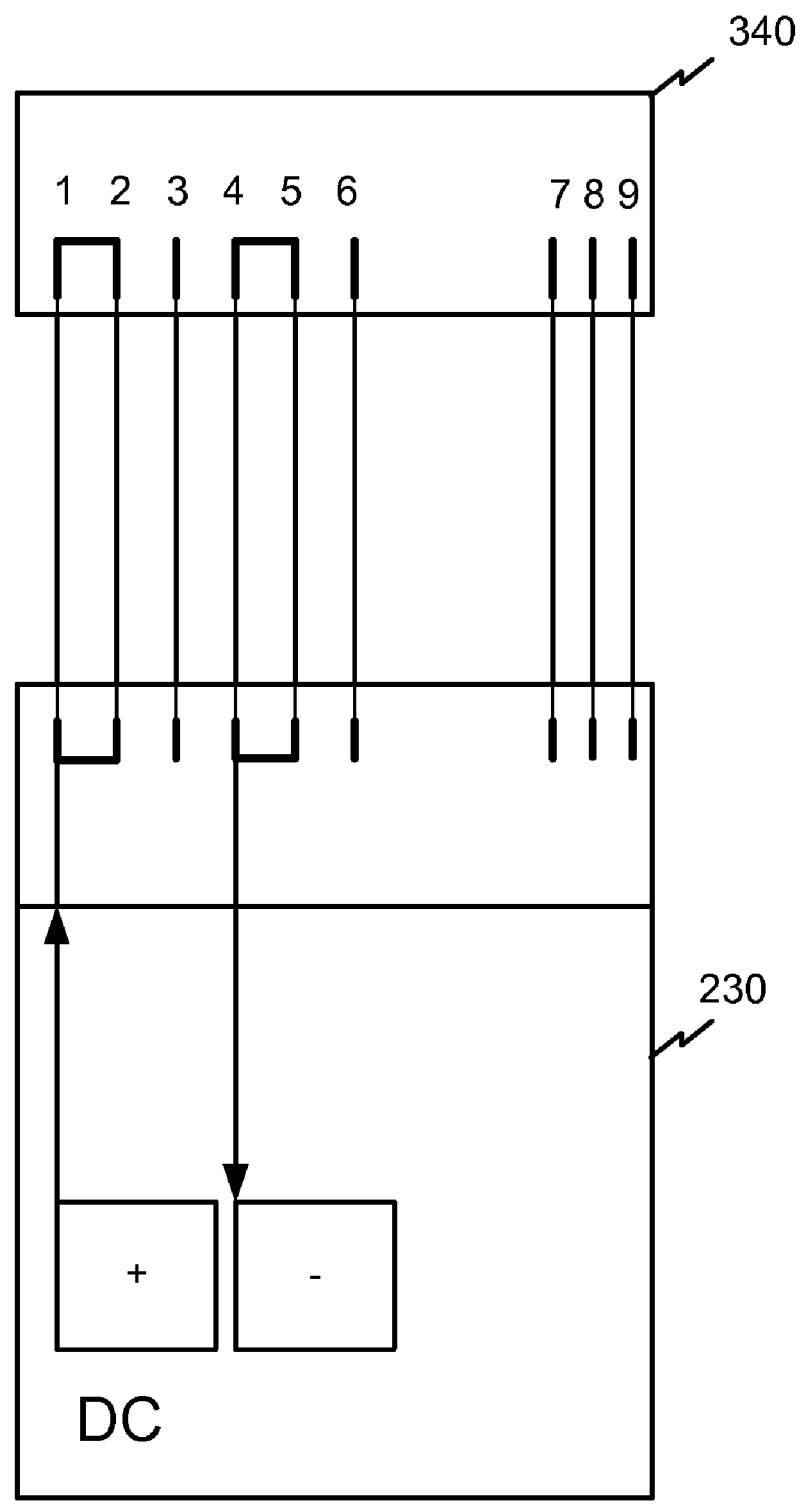

FIGS. 3A and 3B illustrate the connection module of FIG. 2 supplying redundant power within the exemplary device of FIG. 1 according to a first N+N exemplary implementation. FIG. 3A depicts connection module 220, which includes midplane 310, power over Ethernet connection 320 and interconnect module 330, supplying N+N redundant power from multiple PEMs 230-0 through 230-3 to FRUs 210.

Midplane 310 of connection module 220 may include electrical connections that may connect FRUs 210 to interconnect module 330. Midplane 310 may also include a power over Ethernet connection 320 in order to provide power to FRUs 210 via an Ethernet connection.

Interconnect module 330 may include connection ports used to receive power from PEMs 230 and circuit pathways to deliver power to midplane 310. For example, interconnect module 330 may include four connection ports 340-1 to 340-4 (collectively referred to as connection ports 340) that may receive power from four power entry modules PEMs 230 that may be plugged into ports 340. As shown, each connection port 340 may include nine connection pins that may connect to respective power entry modules 230. It should be understood that the number of pins contained in interconnect module 330 may be more or less depending on the requirements of a power delivery system of device 110 and/or the requirements of the power entry modules 230 plugged into ports 340. Dashed line connections shown in interconnect module 330 indicate circuit pathways that are present, but, are not used in DC power connections, as described further below.

Power entry modules (PEMs) 230 may include a DC power supply and connections to enable power to be supplied from the DC power supply to interconnect module 330. In this example, PEMs 230 may include nine pins that may be used to connect to interconnect module 330. As mentioned above, it should be understood that the number of pins contained in PEMs 230 may be more or less depending on the requirements of a power delivery system of device 110 and/or the requirements of the interconnect module 330.

FIG. 3B shows an enlarged view of a port 340 and a PEM 230 as connected in FIG. 3A. As shown, port 340 includes nine pins (labeled 1-9). Similarly, PEM 230 includes nine pins that connect to the nine pins in port 340. In the example shown in FIG. 3B, the first two pins of each PEM 230 may be connected to the positive terminal of the DC power supply, and the fourth and fifth pins of each PEM 230 may be connected to a negative side of the DC power supply. When PEMs 230 are plugged into ports 340 the first two pins of port 340 may receive power from the positive terminal of the DC power supply and the fourth and fifth pins of port 340 may return power to the negative side of the DC power supply. As the third and sixth pins of PEMs 230 are not connected to either the positive or negative terminals of a DC power supply, these pins do not supply or return power to/from interconnect module 330. Therefore, in the example shown in FIG. 3A, the dashed line connections between ports 340 using the third and sixth pins represent circuit paths that exist but do not perform power delivery.

Using the exemplary connection ports and circuit pathways included in interconnect module 330, as shown in FIG. 3A, PEM 230-0 supplies power to zone 0 FRUs 210 and PEM 230-1 supplies power to zone 1 FRUs 210. PEM 230-2 supplies backup power to zone 0 FRUs 210 and PEM 230-3 supplies backup power to zone 1 FRUs 210. In this manner, interconnect module 330 provides power from PEMs 230 in a 2+2 redundant manner, where two PEMs (230-0 and 230-1) provide power to the two zones, and each of the two PEMs (230-0 and 230-1) have a redundant or backup power supply (i.e., PEM 230-2 and 230-3 respectively).

Specifically, pins one and two of PEM 230-0 (and connection port 340-0) deliver power from the positive terminal of DC power supply to zone 0 FRUs 210. Power returning from zone 0 FRUs 210 to the negative terminal of DC power supply may return via the fourth pin of connection port 340-0 (and PEM 230-0). Similarly, PEM 230-2 supplies backup power to zone 0 FRUs 210 in the same manner as PEM 230-0. Pins one and two of PEM 230-1 (and connection port 340-1) deliver power from the positive terminal of DC power supply to zone 1 FRUs 210. Power returning from zone 1 FRUs 210 to the negative terminal of DC power supply may return via the fourth pin of connection port 340-1 (and PEM 230-1). Similarly, PEM 230-3 supplies backup power to zone 1 FRUs 210 in the same manner as PEM 230-1.

Figure 4B:
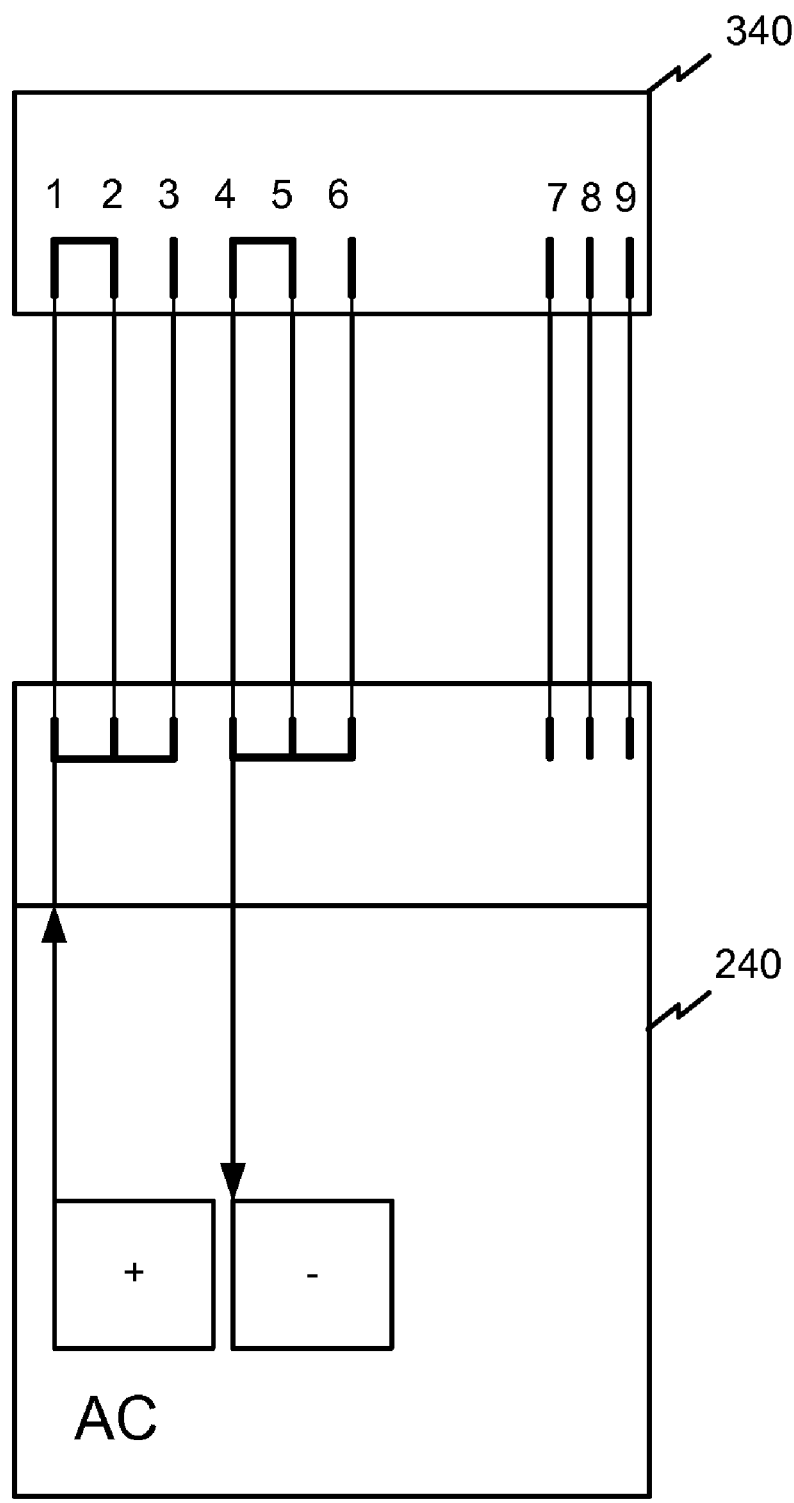

FIGS. 4A and 4B illustrate the connection module of FIG. 2 supplying redundant power from AC power supplies within the exemplary device of FIG. 1 according to a first M+1 exemplary implementation. FIG. 4A depicts connection module 220, which includes midplane 310, power over Ethernet connection 320 and interconnect module 330, supplying M+1 redundant DC power from PSs 240-0 through 240-3 to FRUs 210.

Interconnect module 330 may include connection ports used to receive power from PSs 240 and circuit pathways to deliver power to midplane 310. For example, interconnect module 330 may include the same connection ports 340-1 to 340-4 (described above with respect to FIG. 3A) and which may receive output DC power from four AC power supplies PSs 240-0 to 240-3 that may be plugged into ports 340. As shown, connection ports 340 may include nine connection pins that may connect to PSs 240. It should be understood that the number of pins contained in interconnect module 330 may be more or less depending on the requirements of a power delivery system of device 110 and/or the requirements of the PSs 240 plugged into connection ports 340.

Power supplies (PSs) 240 may include a load sharing AC power supply, AC to DC conversion circuitry and connections to enable output DC power to be supplied from PSs 240 to interconnect module 330. In this example, PSs 240 may include nine pins that may be used to connect to connection ports 340 in interconnect module 330. As mentioned above, it should be understood that the number of pins contained in PSs 240 may be more or less depending on the requirements of a power delivery system of device 110 and/or the requirements of the interconnect module 330.

FIG. 4B shows an enlarged view of a port 340 and a PS 240 as connected in FIG. 4A. As shown, port 340 includes nine pins (labeled 1-9). Similarly, PS 240 includes nine pins that connect to the nine pins in port 340. In the example shown in FIG. 4B, the first three pins of each PS 240 may be connected to the positive (DC output) terminal of the AC power supply and the fourth, fifth and sixth pins of each PS 240 may be connected to a negative (DC output) terminal of the AC power supply. When each PS 240 is plugged into port 340 the first three pins of port 340 may receive power from the positive (DC output) terminal of the AC power supply and the fourth through sixth pins of port 340 may return power to the negative (DC output) terminal of the AC power supplies. As the seventh through ninth pins of each PS 240 are not connected to either the positive or negative terminals of an AC power supply, these pins do not supply or return power to/from interconnect module 330. As the third and sixth pins of each PS 240 are connected to the positive and negative terminals of the AC power supply, the connections between ports 340 as shown in FIG. 4A are utilized, unlike FIGS. 3A-3B. As shown in FIG. 3A, the third and sixth pins are not connected to the DC power supply terminals, thus the dashed line connections shown in FIG. 3A are not used (i.e., do not perform power delivery/return).

Using the exemplary connections included in interconnect module 330 as shown in FIG. 4A, PS 240-0, PS 240-1, PS 240-2 and PS 240-3 each supply power to zone 0 FRUs 210 and supply power to zone 1 FRUs 210. Only three power supplies are required to deliver full power to the FRUs 210 and any one of the four PSs 240 may fail without impacting the system. In this manner, interconnect module 330 provides DC power from PSs 240 in a 3+1 redundant manner, where any three PSs provide power to both of the two zones, and one PS provides redundant or backup power to the two zones.

Specifically, regarding PS 240-0, pins one and two of connection port 340-0 deliver power from the positive terminal of AC power supply (in PS 240-0) to zone 0 FRUs 210. Power returning from the zone 0 FRUs 210 to the negative terminal of AC power supply (in PS 240-0) may return via the fourth and fifth pin of connection port 340-0. Additionally, pin one of connection port 340-0 is connected to pin three of connection port 340-1. In this manner, power may also be provided from PS 240-0 to zone 1 FRUs 210 via pin three of connection port 340-1.

Regarding returning power from zone 1 FRUs 210, pin 4 of connection port 340-0 (that carries returning power from zone 0 FRUs 210) may be connected to pin six of connection port 340-3. In this manner, power is returned from zone 1 FRUs 210 to the negative terminals of AC power supplies included in both PS 240-0 and PS 240-3. Connecting the positive terminals of power supplies included in PS 240-0 and PS 240-1 and the negative terminals of power supplies included in PS 240-0 and PS 240-3, ensures that power supplies included in PS 240-0 and PS 240-1 are not directly connected in parallel. For example, if both the positive and negative terminals of the power supplies included in PS 240-0 and PS 240-1 were connected together, a short circuit (of either power supply) would cause power from both power supplies to be dissipated throughout the FRUs 210. By connecting returning power (supplied from PS 240-0) from zone 0 FRUs 210 to PS 240-3 (via pin six of connection port 340-3), a short circuit of the power supply in PS 240-0 results in power from only that one power supply being dissipated throughout the system (as opposed to power from both the power supplies in PS 240-0 and PS 240-1).

Regarding PS 240-1, pins one and two of connection port 340-1 deliver power from the positive terminal of AC power supply (in PS 240-1) to zone 1 FRUs 210. Power returning from the zone 1 FRUs 210 to the negative terminal of AC power supply (in PS 240-1) may return via the fourth and fifth pin of connection port 340-1. Additionally, pin one of connection port 340-1 is connected to pin three of connection port 340-0. In this manner, power may also be provided from PS 240-1 to zone 0 FRUs 210.

Regarding returning power (supplied by PS 240-1) from zone 0 FRUs 210, pin 4 of connection port 340-1 (that carries returning power from zone 1 FRUs 210) may be connected to pin six of connection port 340-2. In this manner, power is returned from zone 0 FRUs 210 to the negative terminals of AC power supplies included in both PS 240-1 and PS 240-0. Connecting the positive terminals of power supplies included in PS 240-1 and PS 240-2 and the negative terminals of power supplies included in PS 240-1 and PS 240-2 ensures that power supplies included in PS 240-1 and PS 240-2 are not directly connected in parallel. For example, if both the positive and negative terminals of the power supplies included in PS 240-1 and PS 240-2 were connected together, a short circuit (of either power supply) would cause power from both power supplies to be dissipated throughout the FRUs 210. By connecting returning power (supplied from PS 240-1) from zone 1 FRUs 210 to PS 240-2 (via pin six of connection port 340-2), a short circuit of the power supply in PS 240-1 results in power from only that one power supply being dissipated throughout the system (as opposed to power from both the power supplies in PS 240-1 and PS 240-2).

Regarding PS 240-2, connection port 340-2 supplies power to zone 0 FRUs 210 and returns power (to PS 240-2) via pin four. Positive terminals of power supplies in PS 240-2 and PS 240-3 are connected together (via pins 1 and 3 of connection ports 340-2 and 340-3) while returning power via pin four of connection port 340-2 may be connected to the negative terminal of the power supply included in PS 240-1. As described above, connecting the positive terminals of power supplied connected in PS 240-2 and 240-3 without connecting the returning power paths of PS 240-2 and PS 240-3, ensures that a short circuit of the power supply contained in PS 240-2 results in power from only that one power supply being dissipated throughout the system.

Regarding PS 240-3, connection port 340-3 supplies power to zone 1 FRUs 210 via pin one and returns power (to PS 240-3) via pin four. Positive terminals of power supplies in PS 240-2 and PS 240-3 are connected together (via pins 1 and 3 of connection ports 340-2 and 340-3) while returning power via pin four of connection port 340-3 may also be connected to the negative terminal of the power supply included in PS 240-0. As described above, connecting the positive terminals of power supplied connected in PS 240-2 and 240-3 without connecting the returning power paths of PS 240-2 and PS 240-3, ensures that a short circuit of the power supply contained in PS 240-3 results in power from only that one power supply being dissipated throughout the system.

As described above, the connections provided by interconnect module 330 allow power to be provided from each PS 240 to both zones (0 and 1). Also, the returning power connections provided by interconnect module 330 ensure that a short circuit of any power supply may be an isolated short circuit where power from only the shorted power supply is dissipated throughout the system. Further, as the connections provided by connection ports 340 (and midplane 310) are identical in both FIGS. 3A and 4A, interconnect module 330 may receive either four AC power supplies (PSs 240) or may receive four DC power supplies (PEMs 230) and provide power to FRUs without requiring a change of connections. In this manner, interconnect module 330 may provide either N+N redundant power (2+2 as shown in FIG. 3A) and M+1 redundant power (3+1 as shown in FIG. 4A).

Figure 5A:
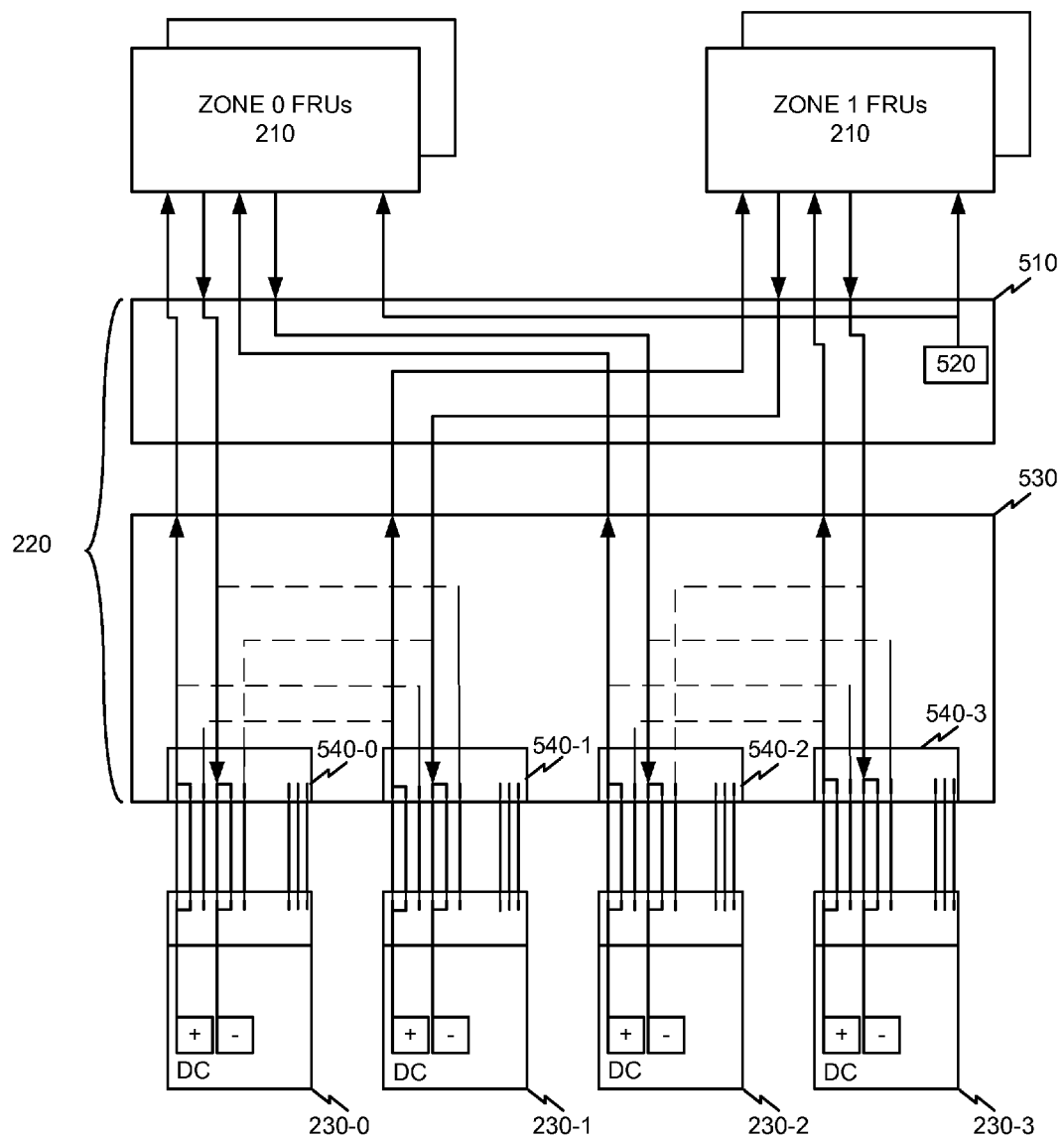
FIGS. 5A and 5B illustrate the connection module of FIG. 2 supplying redundant power within the exemplary device of FIG. 1 according to a second N+N exemplary implementation.
Figure 5B:
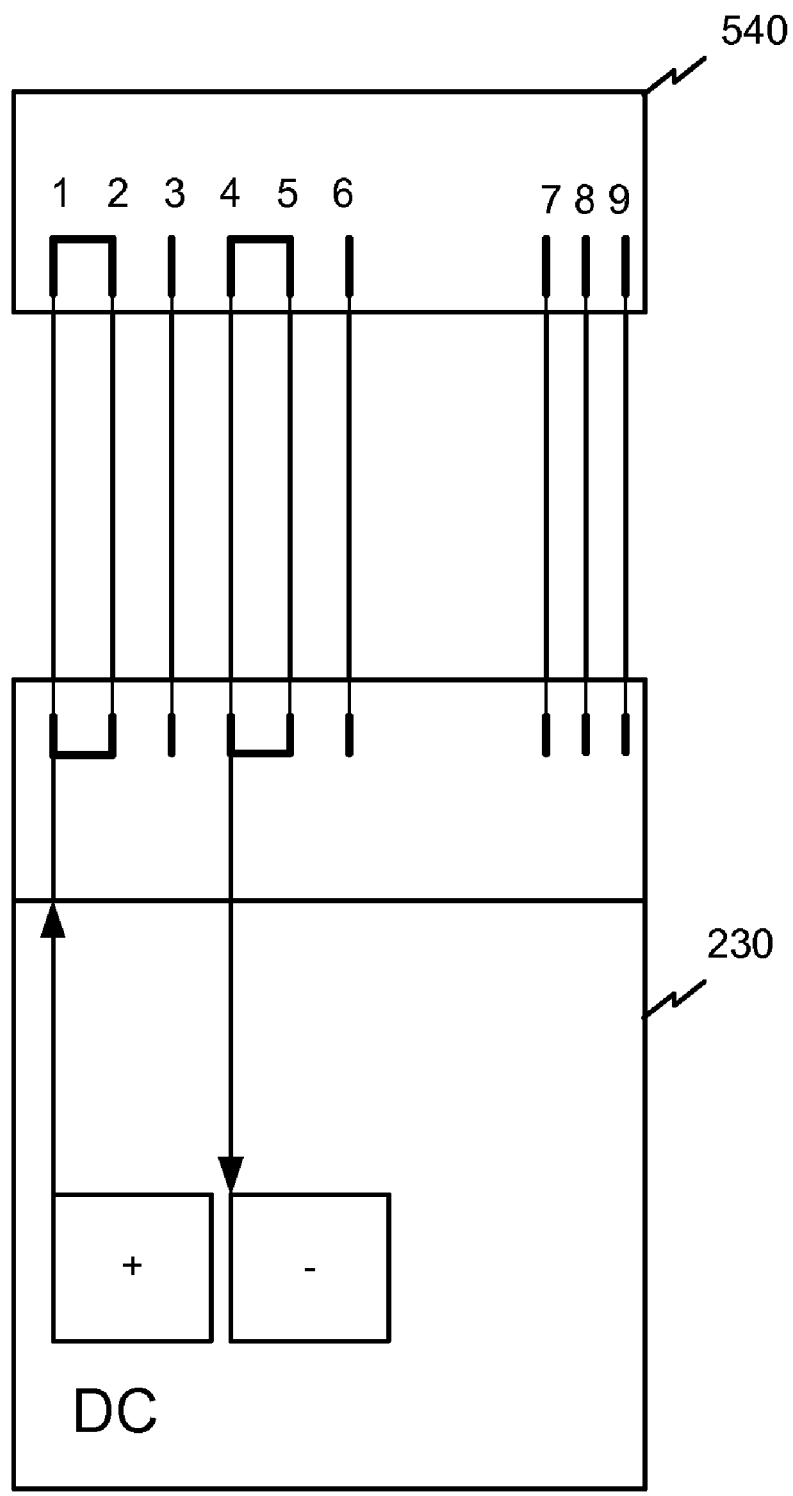

FIGS. 5A and 5B illustrate the connection module of FIG. 2 supplying redundant power within the exemplary device of FIG. 1 according to a second N+N exemplary implementation. FIG. 5A depicts connection module 220, which includes midplane 510, power over Ethernet connection 520 and interconnect module 530, supplying N+N redundant power from PEMs 230-0 through 230-3 to FRUs 210.

Midplane 510 may include electrical connections that may connect FRUs 210 to interconnect module 530. Midplane 510 may also include a power over Ethernet connection 520 in order to provide power to FRUs 210 via an Ethernet connection.

Interconnect module 530 may include connection ports used to receive DC power from PEMs 230 and circuit pathways to deliver power to midplane 510. For example, interconnect module 530 may include four connection ports 540-1 to 540-4 that may receive power from four power entry modules PEMs 230 that may be plugged into ports 540. As shown, connection ports 540 may include nine connection pins that may connect to power entry modules 230. It should be understood that the number of pins contained in interconnect module 530 may be more or less depending on the requirements of a power delivery system of device 110 and/or the requirements of the power entry modules 230 plugged into connection ports 540.

Power entry modules (PEMs) 230 may include a DC power supply and connections to enable power to be supplied from the DC power supply to interconnect module 530. In this example, PEMs 230 may include nine pins that may be used to connect to interconnect module 530. As mentioned above, it should be understood that the number of pins contained in PEMs 230 may be more or less depending on the requirements of a power delivery system of device 110 and/or the requirements of the interconnect module 530.

FIG. 5B shows an enlarged view of a port 540 and a PEM 230 as connected in FIG. 5A. As shown, port 540 includes nine pins (labeled 1-9). Similarly, PEM 230 includes nine pins that connect to the nine pins in port 540. In the example shown in FIG. 5B, the first two pins of connection port 540 may be connected to the positive terminal of the DC power supply and the fourth and fifth pins of connection port 540 may be connected to a negative side of the DC power supply. As the third and sixth pins of each PEM 230 are not connected to either the positive or negative terminals of a DC power supply, these pins do not supply or return power to/from interconnect module 530. Therefore, in the example shown in FIG. 5A, the dashed line connections between ports 540 using the third and sixth pins (are present, however) do not perform power delivery.

Using the exemplary connections included in interconnect module 530 as shown in FIG. 5A, PEM 230-0 supplies power to zone 0 FRUs 210 and PEM 230-1 supplies power to zone 1 FRUs 210. PEM 230-2 supplies backup power to zone 0 FRUs 210 and PEM 230-3 supplies backup power to zone 1 FRUs 210. In this manner, interconnect module 530 provides power from PEMs 230 in a 2+2 redundant manner, where two PEMs (230-0 and 230-1) provide power to the two zones, and each of the two PEMs (230-0 and 230-1) have a redundant or backup power supply (i.e., PEM 230-2 and 230-3 respectively).

Specifically, pins one and two of PEM 230-0 (and connection port 540-0) deliver power from the positive terminal of DC power supply to zone 0 FRUs 210. Power returning from zone 0 FRUs 210 to the negative terminal of DC power supply may return via the fourth pin of connection port 530 (and PEM 230-0). Similarly, PEM 230-2 supplies backup power to zone 0 FRUs 210 in the same manner as PEM 230-0. Pins one and two of PEM 230-1 (and connection port 530) deliver power from the positive terminal of DC power supply to zone 1 FRUs 210. Power returning from zone 1 FRUs 210 to the negative terminal of DC power supply may return via the fourth pin of connection port 540 (and PEM 230-1). Similarly, PEM 230-3 supplies backup power to zone 1 FRUs 210 in the same manner as PEM 230-1.

Figure 6B:
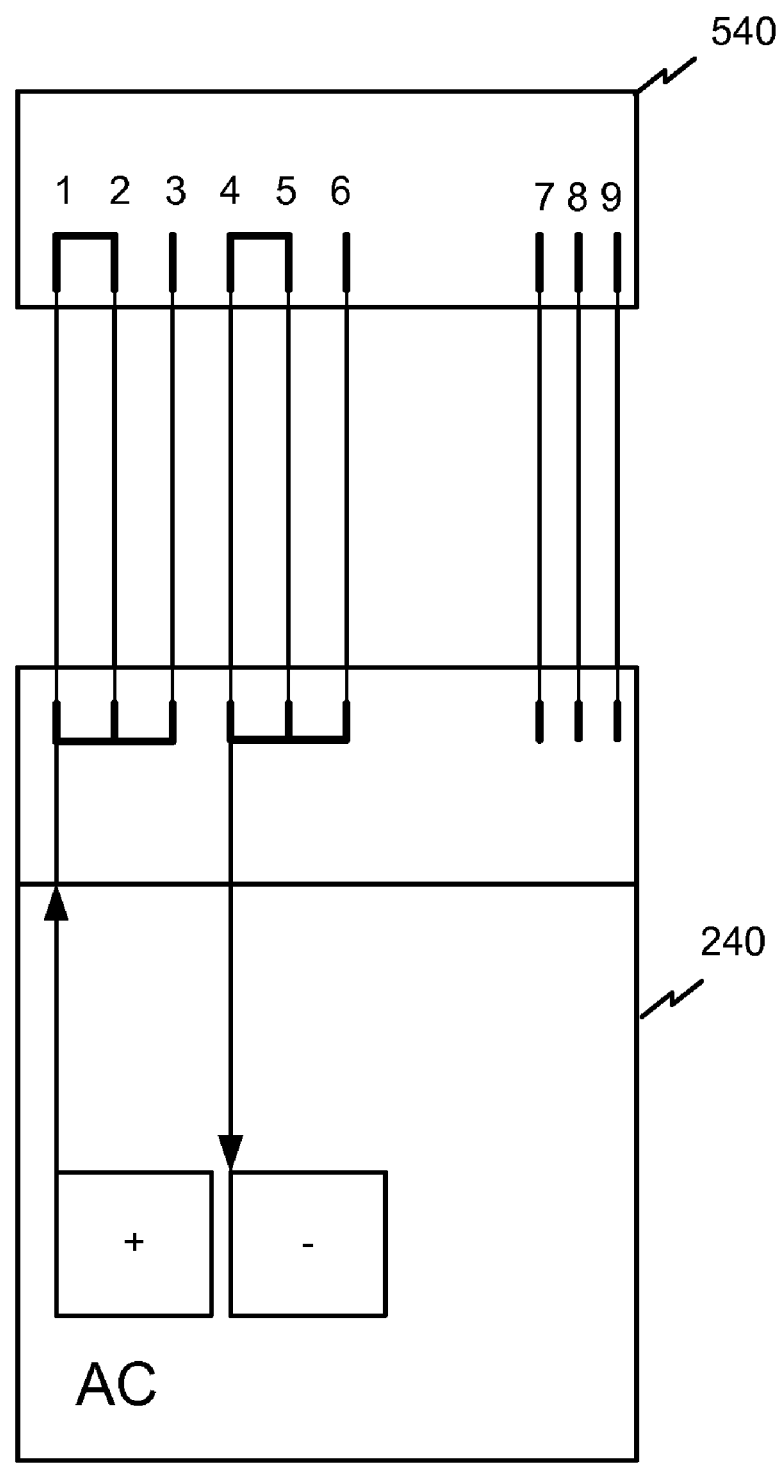

FIGS. 6A and 6B illustrate the connection module of FIG. 2 supplying redundant power within the exemplary device of FIG. 1 according to a second M+1 exemplary implementation. FIG. 6A depicts connection module 220, which includes midplane 510, power over Ethernet connection 520 and interconnect module 530, supplying M+1 redundant power received from AC power supplies included in PSs 240-0 through 240-3 to FRUs 210.

Interconnect module 530 may include connection ports used to receive power from a device and circuit pathways to deliver power to midplane 510. For example, interconnect module 530 may include four connection ports 540-1 to 540-4 that may receive DC output power from four AC power supplies PSs 240-0 to 240-3 that may be plugged into ports 540. As shown, connection ports 540 may include nine connection pins that may connect to PSs 240. It should be understood that the number of pins contained in interconnect module 530 may be more or less depending on the requirements of a power delivery system of device 110 and/or the requirements of the PSs 240 plugged into connection ports 540.

Power supplies (PSs) 240 may include a load sharing AC power supply, AC to DC conversion circuitry and connections to enable output DC power to be supplied from the AC power supplies to interconnect module 530. In this example, PSs 240 may include nine pins that may be used to connect to connection ports 540 in interconnect module 530. As mentioned above, it should be understood that the number of pins contained in PSs 240 may be more or less depending on the requirements of a power delivery system of device 110 and/or the requirements of the interconnect module 530.

FIG. 6B shows an enlarged view of a port 540 and a PS 240 as connected in FIG. 6A. As shown, port 540 includes nine pins (labeled 1-9). Similarly, PS 240 includes nine pins that connect to the nine pins in port 540. In the example shown in FIG. 6B, the first three pins of each PS 240 may be connected to the positive (DC output) terminal of the AC power supply and the fourth, fifth and sixth pins of each PS 240 may be connected to a negative (DC output) terminal of the AC power supply. When each PS 240 is plugged into port 540 the first three pins of port 540 may receive power from the positive (DC output) terminal of the AC power supply and the fourth through sixth pins of port 540 may return power to the negative (DC output) terminal of the AC power supplies included in PS 240. As the seventh through ninth pins of each PS 240 are not connected to either the positive or negative terminals of an AC power supply, these pins do not supply or return power to/from interconnect module 530. As the third and sixth pins of each PS 240 are connected to the positive and negative terminals of the AC power supply, the connections between ports 540 as shown in FIG. 6A are utilized, unlike FIGS. 5A-5B. As shown in FIG. 5A, the third and sixth pins are not connected to the DC power supply terminals, thus the dashed line connections shown in FIG. 5A are not used (i.e., do not perform power delivery/return).

Using the exemplary connection ports and circuit pathways included in interconnect module 530, as shown in FIG. 6A, PS 240-0, PS 240-1, PS 240-2 and PS 240-3 each supply power to zone 0 FRUs 210 and supply power to zone 1 FRUs 210. Any one of the PSs 240 may supply backup power to zone 0 FRUs 210 and zone 1 FRUs 210. In this manner, interconnect module 530 provides power from PSs 240 in a 3+1 redundant manner, where any three PSs provide sufficient power to both of the two zones, and one PS may provide redundant or backup power to the two zones.

Specifically regarding PS 240-0, pins one and two of connection port 540-0 deliver power from the positive terminal of AC power supply (in PS 240-0) to zone 0 FRUs 210. Power returning from the zone 0 FRUs 210 to the negative terminal of AC power supply (in PS 240-0) may return via the fourth and fifth pin of connection port 540-0. Additionally, pin one of connection port 540-0 is connected to pin three of connection port 540-1. In this manner, power may also be provided from PS 240-0 to zone 1 FRUs 210 via pin three of connection port 540-1.

Regarding returning power from zone 1 FRUs 210, pin four of connection port 540-0 (that carries returning power from zone 0 FRUs 210) may be connected to pin six of connection port 540-1. In this manner, power is returned from zone 1 FRUs 210 to the negative terminals of AC power supplies included in both PS 240-0 and PS 240-1. Connecting both the positive terminals of power supplies included in PS 240-0 and PS 240-1 and the negative terminals of power supplies included in PS 240-0 and PS 240-1 connects these power supplies in parallel. A short circuit of either of the power supplies included in PS 240-0 and PS 240-1 may cause power from both power supplies to be dissipated throughout the FRUs 210, however as the power supplies are connected in parallel, this prevents twice the voltage of one power supply (due to a series connection) from being applied across the FRUs 210 if a short circuit occurs.

Regarding PS 240-1, pins one and two of connection port 540-1 deliver power from the positive terminal of AC power supply (in PS 240-1) to zone 1 FRUs 210. Power returning from the zone 1 FRUs 210 to the negative terminal of AC power supply (in PS 240-1) may return via the fourth and fifth pin of connection port 540-1. Additionally, pin one of connection port 540-1 is connected to pin three of connection port 540-0. In this manner, power may also be provided from PS 240-1 to zone 0 FRUs 210.

Regarding returning power (supplied by PS 240-1) from zone 0 FRUs 210, pin 4 of connection port 540-1 (that carries returning power from zone 1 FRUs 210) may be connected to pin six of connection port 540-0. In this manner, power is returned from zone 0 FRUs 210 to the negative terminals of AC power supplies included in both PS 240-1 and PS 240-0. Connecting the positive terminals of power supplies included in PS 240-1 and PS 240-0 and the negative terminals of power supplies included in PS 240-1 and PS 240-0 connects these power supplies in parallel, which prevents twice the voltage of one power supply (due to a series connection) from being applied across the FRUs 210 if a short circuit occurs.

Regarding PS 240-2, pins one and two of connection port 540-2 deliver power from the positive terminal of AC power supply (in PS 240-2) to zone 0 FRUs 210. Power returning from the zone 0 FRUs 210 to the negative terminal of AC power supply (in PS 240-2) may return via the fourth and fifth pin of connection port 540-2. Additionally, pin one of connection port 540-2 is connected to pin three of connection port 540-3. In this manner, power may also be provided from PS 240-2 to zone 1 FRUs 210.

Regarding returning power (supplied by PS 240-2) from zone 1 FRUs 210, pin 4 of connection port 540-2 (that carries returning power from zone 0 FRUs 210) may be connected to pin six of connection port 540-3. In this manner, power is returned from zone 1 FRUs 210 to the negative terminals of AC power supplies included in both PS 240-2 and PS 240-3. Connecting the positive terminals of power supplies included in PS 240-2 and PS 240-3 and the negative terminals of power supplies included in PS 240-2 and PS 240-3 connects these power supplies in parallel, which prevents twice the voltage of one power supply (due to a series connection) from being applied across the FRUs 210 if a short circuit occurs.

Regarding PS 240-3, pins one and two of connection port 540-3 deliver power from the positive terminal of AC power supply (in PS 240-3) to zone 1 FRUs 210. Power returning from the zone 1 FRUs 210 to the negative terminal of AC power supply (in PS 240-3) may return via the fourth and fifth pin of connection port 540-3. Additionally, pin one of connection port 540-3 is connected to pin three of connection port 540-2. In this manner, power may also be provided from PS 240-3 to zone 0 FRUs 210.

Regarding returning power (supplied by PS 240-3) from zone 0 FRUs 210, pin 4 of connection port 540-3 (that carries returning power from zone 1 FRUs 210) may be connected to pin six of connection port 540-2. In this manner, power is returned from zone 0 FRUs 210 to the negative terminals of AC power supplies included in both PS 240-2 and PS 240-3. As described above, connecting the positive terminals of power supplies included in PS 240-2 and PS 240-3 and the negative terminals of power supplies included in PS 240-2 and PS 240-3 connects these power supplies in parallel, which prevents twice the voltage of one power supply (due to a series connection) from being applied across the FRUs 210 if a short circuit occurs.

Figure 7:
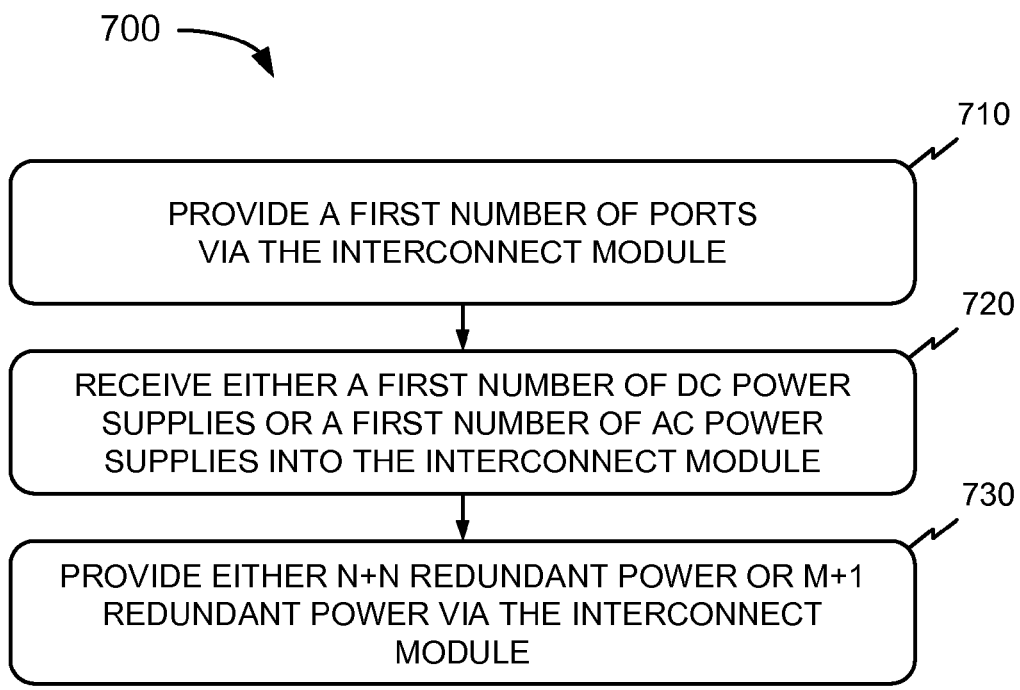
FIG. 7 is a flow diagram of an exemplary process for supplying N+N or M+1 redundant power to the exemplary device of FIG. 1 using the exemplary connection modules shown in FIGS. 3A-6B.

FIG. 7 is an exemplary process 700 of delivering power using connection module 220, as shown in FIGS. 3A-6B. Referring to FIGS. 3A-6B, process 700 may begin by providing a first number of ports via an interconnect module (block 710). As shown in both FIGS. 3A and 4A for example, four connection ports 340-0 to 340-3, may be included in interconnect module 330. Also, as shown in both FIG. 5A and FIG. 6A for example, four connection ports 540-0 to 540-3 may be included in interconnect module 530. Process 700 may continue by receiving either a first number of DC power supplies or a first number of AC power supplies into the interconnect module (block 720). As shown in FIG. 3A for example, four connection ports 340-0 to 340-3 in interconnect module 330 may receive four DC PEMs 230-0 to 230-3. As shown in FIG. 4A for example, the same four connection ports 340-0 to 340-3 in interconnect module 330 may also receive four AC power supplies PSs 240-0 to 240-3. As shown in FIG. 5A for example, four connection ports 540-0 to 540-3 in interconnect module 530 may receive four PEMs 230-0 to 230-3. As shown in FIG. 6A for example, the same four connection ports 540-0 to 540-3 in interconnect module 330 may also receive four AC power supplies PSs 240-0 to 240-3. Once connected via ports (340 or 540), either N+N (e.g., 2+2) redundant power or M+1 (e.g., 3+1) redundant power may be provided via the interconnect module (block 730).

In other examples, interconnect module 330 may include two or six connection ports 340. In these examples, the number of power zones within device 110 may be one or three respectively. For example, if interconnect module 330 includes only two connection ports 340, there may be only one power zone for the FRUs 210. With only two connection ports 340, 1+1 redundant DC input/DC output power and 1+1 redundant AC input/DC output power may be provided to the single power zone. Referring to FIGS. 3A and 4A, connection ports 340-0 and 340-2 in interconnect module 330 may be used to provide 1+1 redundant DC input/DC output power and 1+1 redundant AC input/DC output power to the single power zone (zone 0).

If interconnect module 330 includes six connection ports 340, there may be three power zones for the FRUs 210. With six connection ports 340, 3+3 redundant power and 5+1 redundant power may be provided to the three power zones. Referring to FIGS. 3A and 4A, two additional connection ports 340 may be required to provide 3+3 redundant power and 5+1 redundant power to the three power zones. In this example, when supplying DC power, the two additional connection ports 340 may be connected such that one port provides power and one port provides backup power (as shown in FIG. 3A) and when supplying AC power, the two additional ports 340 may be connected (via interconnect module 330) in the same manner as ports 340-2 and 340-3 (as shown in FIG. 4A) to supply power to the third power zone. In this example, the positive terminals of additional power supplies may be connected without connecting the returning power paths directly, as described above.

In other examples, interconnect module 530 may include two or six connection ports 540. In these examples, the number of power zones within device 110 may be one or three respectively. For example, if interconnect module 530 includes only two connection ports 540, there may be only one power zone for the FRUs 210. With only two connection ports 540, 1+1 redundant DC input/DC output power and 1+1 redundant AC input/DC output power may be provided to the single power zone. Referring to FIGS. 5A and 6A for example, connection ports 540-0 and 540-2 may be used to provide 1+1 redundant DC input/DC output power and 1+1 redundant AC input/DC output power to a single power zone (zone 0).

If interconnect module 530 includes six connection ports 540, there may be three power zones for the FRUs 210. With six connection ports 540, 3+3 redundant power and 5+1 redundant power may be provided to the three power zones. Referring to FIG. 5A and FIG. 6A, two additional connection ports 540 may be required to provide 3+3 redundant power and 5+1 redundant power to the three power zones. In this example, when supplying DC power, the two additional connection ports 540 are connected such that one port provides power and one port provides backup power (as shown in FIG. 5A) and when supplying AC power, the two additional ports 540 may be connected (via interconnect module 530) in the same manner as ports 540-2 and 540-3 (as shown in FIG. 6A) to supply power to the third power zone. In this example, both the positive and negative terminals of additional power supplies may be connected, as described above.

As described above, as the connections provided by interconnect module 530 and connection ports 540 (and midplane 510) are identical in FIG. 5A and FIG. 6A, interconnect module 530 may receive a number of AC power supplies or may receive a number of DC power supplies and provide power to FRUs 210 without requiring a change of connections. In this manner, interconnect module 530 may provide either one of N+N redundant power or M+1 redundant power.

CONCLUSION

Implementations described herein may allow ports within an interconnect module to receive either an AC power supply or a DC power supply. Connections within the interconnection module allow for either N+N redundant power or M+1 redundant power to be applied to power zones within the device.

The foregoing description of preferred embodiments of the present embodiments provides illustration and description, but is not intended to be exhaustive or to limit the embodiments to the precise form disclosed. Modifications and variations are possible in light of the above teachings or may be acquired from practice of the embodiments. For example, while series of acts have been described with regard to FIG. 7, the order of the acts may differ or be performed in parallel in other implementations consistent with the present embodiments. Furthermore, various implementations have been described with respect to two power zones and using 2+2 redundant power distribution or 3+1 redundant power distribution. However, the connection module described herein may be applied, with minor modifications, to any N+N or M+1 redundant power distribution system.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the principles of the embodiments should be construed as critical unless explicitly described as such. Also as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
    a plurality of ports,
    each port to:
        selectively receive a connection from one of an alternating current (AC) power supply or a direct current (DC) power supply, and
        provide power, from the one of the AC power supply or the DC power supply, to one or more other devices that are different than the device,
    each port including a plurality of pins, one or more pins, of the plurality of pins, being connected to one or more pins of another port of the plurality of ports,
    a first number of pins, of the plurality of pins, that receives power from and returns power to the DC power supply when the port is connected to the DC power supply being different than a second number of pins, of the plurality of pins, that receives power from and returns power to the AC power supply when the port is connected to the AC power supply,
    the second number of pins including:
        pins of the first number of pins, and
        the one or more pins of the port, and
        the first number of pins excluding the one or more pins of the port.

2. The device of claim 1, where a first device, of the one or more other devices, is included in a first power zone, where a second device, of the one of more other devices, is included in a second power zone different than the first power zone, and where the plurality of ports are to provide power to the first power zone and the second power zone, when providing the power to the first power zone and the second power zone:

a first port, of the plurality of ports, is to provide power, received from a particular AC power supply, to the first power zone, and a second port, of the plurality of ports, is to provide the power, received by the first port from the particular AC power supply, to the second power zone based on one or more pins of the first port being connected to one or more pins of the second port.

3. The device of claim 1, where, when a particular number of ports, of the plurality of ports, are connected to AC power supplies, the particular number of ports are to provide M+1 redundant power from the AC power supplies to the one or more other devices.

4. The device of claim 3, where, when providing the M+1 redundant power, the particular number of ports are to provide, to the one or more other devices, at least one of 3+1 redundant power or 5+1 redundant power.

5. The device of claim 1, where, when a particular number of ports, of the plurality of ports, are connected to DC power supplies, the particular number of ports are to provide N+N redundant power from the DC power supplies to the one or more other devices.

6. The device of claim 5, where, when providing the N+N redundant power, the particular number of ports are to provide, to the one or more other devices, at least one of 2+2 redundant power or 3+3 redundant power.

7. A method comprising:

connecting, by a device, a port that includes a plurality of pins, one or more pins, of the plurality of pins, being connected to one or more pins of another port of the device, the port selectively receiving a connection from one of an alternating current (AC) power supply or a direct current (DC) power supply, a first number of pins, of the plurality of pins, that receives power from and returns power to the DC power supply when the port is connected to the DC power supply being different than a second number of pins, of the plurality of pins, that receives power from and returns power to the AC power supply when the port is connected to the AC power supply, the second number of pins including pins of the first number of pins and the one or more pins of the port, and the first number of pins excluding the one or more pins of the port;

receiving, by the device and via the port, a connection from one of the AC power supply or the DC power supply; and providing, by the device and via the port, the power, received from the one of the AC power supply or the DC power supply, to another device.

8. The method of claim 7, further comprising:

providing, using the port and the other port, redundant power to the other device.

9. The method of claim 8, where the redundant power includes at least one of M+1 redundant power or N+N redundant power.

10. The method of claim 9, where providing redundant power to the other device includes:

providing the M+1 redundant power to the other device when the port and the other port are connected to AC power supplies; and providing the N+N redundant power to the other device when the port and the other port are connected to DC power supplies.

11. The method of claim 10, where providing the M+1 redundant power includes providing at least one of 3+1 redundant power or 5+1 redundant power.

12. The method of claim 10, where providing the N+N redundant power includes providing at least one of 2+2 redundant power or 3+3 redundant power.

13. The method of claim 7, where the other port includes a plurality of pins, where the other port selectively receives a connection from one of an AC power supply or a DC power supply, and where a first number of pins, of the plurality of pins, that receives power from and returns power to AC power supplies is different than a second number of pins, of the plurality of pins, that receives power from and returns power to DC power supplies.

14. A system comprising:

a port, including a plurality of pins, to:

selectively receive a connection from one of an alternating current (AC) power supply or a direct current (DC) power supply, a first number of pins, of the plurality of pins, that receives power from and returns power to the DC power supply when the port is connected to the DC power supply being different than a second number of pins, of the plurality of pins, that receives power from and returns power to the AC power supply when the port is connected to the AC power supply, one or more pins, of the plurality of pins, being connected to one or more pins of another port, the second number of pins including at least one pin, of the first number of pins, and the one or more pins of the port, and the first number of pins excluding the one or more pins of the port; and provide the power, from one of the AC power supply or the DC power supply, to one or more devices.

15. The system of claim 14, the port and the other port to:

provide M+1 redundant power to the one or more devices when the port and the other port are connected to AC power supplies, and provide N+N redundant power to the one or more devices when the port and the other port are connected to DC power supplies.

16. The system of claim 15, where a first device, of the one or more other devices, is included in a first power zone, where a second device, of the one of more other devices, is included in a second power zone different than the first power zone, the second device being different than the first device, and where the port and the other port are to provide power to at least one of the first power zone or the second power zone.

17. The system of claim 16, where, when providing the power to the at least one of the first power zone or the second power zone, the port and the other port are to at least one of:

provide N+N redundant power or M+1 redundant power to the first power zone, or provide N+N redundant power or M+1 redundant power to the second power zone.

18. The system of claim 14, further comprising:

a connection module, where the connection module includes a plurality of ports, where the plurality of ports include the port and the other port, and where each of the plurality of ports is to selectively receive a connection from an AC power supply or a DC power supply.

19. The system of claim 18, where first ports, of the plurality of ports, are to provide redundant power to first devices, and where second ports, of the plurality of ports, are to provide redundant power to second devices, where the first devices are different than the second devices, and where the second ports are different than the first ports.

20. The system of claim 19, where the redundant power provided to the first devices is different than the redundant power provided to the second devices.

* * * * *